(12) United States Patent
Suzuki et al.

(10) Patent No.: US 11,975,644 B2
(45) Date of Patent: May 7, 2024

(54) VEHICLE SEAT AND METHOD OF INSTALLATION

(71) Applicant: Honda Motor Co., Ltd., Tokyo (JP)

(72) Inventors: Junichi Suzuki, Royal Oak, MI (US); Fernando M. Rosero, Rochester Hills, MI (US); Eric D. Daume, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 17/537,151

(22) Filed: Nov. 29, 2021

(65) Prior Publication Data

US 2023/0166646 A1 Jun. 1, 2023

(51) Int. Cl.
 *B60N 2/90* (2018.01)
 *B60N 2/68* (2006.01)
 *B60N 2/75* (2018.01)

(52) U.S. Cl.
 CPC .............. *B60N 2/986* (2018.02); *B60N 2/686* (2013.01); *B60N 2/78* (2018.02)

(58) Field of Classification Search
 CPC .......... B60N 2/986; B60N 2/686; B60N 2/78; B60N 2/75
 See application file for complete search history.

(56) References Cited

U.S. PATENT DOCUMENTS

| | | | | |
|---|---|---|---|---|
| 3,632,157 A | * | 1/1972 | Lohr | B60N 2/012 296/39.1 |
| 3,951,454 A | * | 4/1976 | Tantlinger | B64D 11/06 297/232 |
| 4,088,367 A | * | 5/1978 | Atkinson | A47C 5/12 297/DIG. 2 |
| 4,249,769 A | * | 2/1981 | Barecki | B60N 2/242 296/68.1 |
| 6,659,553 B2 | | 12/2003 | Achleitner et al. | |
| 7,484,758 B2 | | 2/2009 | Hanson et al. | |
| 8,646,562 B2 | | 2/2014 | Fukawatase et al. | |

(Continued)

FOREIGN PATENT DOCUMENTS

| | | |
|---|---|---|
| DE | 102004003251 | 8/2005 |
| DE | 102004020911 | 11/2005 |

(Continued)

*Primary Examiner* — David R Dunn
*Assistant Examiner* — Tania Abraham
(74) *Attorney, Agent, or Firm* — Mark E. Duell; RANKIN, HILL & CLARK LLP

(57) ABSTRACT

A vehicle assembly includes a vehicle body including a side body component and a transverse body component, and a vehicle seat attached to the each of the side and transverse body components. The vehicle seat includes a seat main frame including an attached seat back, a side member attached to the seat main frame, the side member defining an outboard bolster for the seat back and an armrest, and a seat base attached to the seat main frame. A first connection bracket is secured to the transverse body component adjacent an outboard side edge portion of the seat back, and the outboard bolster of the side member is connected to the first connection bracket. A second connection bracket is secured to the side body component and extended toward the seat main frame, and the armrest of the side member is connected to the second connection bracket.

18 Claims, 7 Drawing Sheets

(56) References Cited

U.S. PATENT DOCUMENTS

| | | | | |
|---|---|---|---|---|
| 8,905,475 | B2* | 12/2014 | Schenten | B60N 2/68 |
| | | | | 297/378.13 |
| 9,150,120 | B2 | 10/2015 | Antoine et al. | |
| 9,260,040 | B2* | 2/2016 | Kawamoto | B60N 2/986 |
| 9,452,693 | B2* | 9/2016 | Gardner | B60N 2/68 |
| 10,005,418 | B2* | 6/2018 | Ito | B60R 21/207 |
| 10,065,547 | B2 | 9/2018 | Whitlock | |
| 10,093,210 | B2* | 10/2018 | Izawa | B60N 2/68 |
| 10,202,056 | B2* | 2/2019 | Zimmerman, II | B60N 2/366 |
| 10,315,608 | B2 | 6/2019 | Sadr et al. | |
| 10,513,206 | B2* | 12/2019 | Spahn | B60N 2/4279 |
| 10,829,224 | B2 | 11/2020 | Shinde et al. | |
| 2008/0224511 | A1* | 9/2008 | Herkenrath | B60N 2/3022 |
| | | | | 297/248 |
| 2011/0012386 | A1* | 1/2011 | Brncick | B60N 2/986 |
| | | | | 296/64 |
| 2011/0109114 | A1* | 5/2011 | Kolpasky | B60N 2/797 |
| | | | | 297/344.21 |
| 2012/0200123 | A1* | 8/2012 | Sosnowski | B60R 21/20 |
| | | | | 280/730.2 |
| 2015/0175034 | A1 | 6/2015 | Tully | |
| 2019/0299813 | A1* | 10/2019 | Dimovski | B60R 16/0215 |

FOREIGN PATENT DOCUMENTS

| | | |
|---|---|---|
| DE | 102008026822 | 12/2009 |
| DE | 102010021743 | 12/2011 |
| FR | 3025159 | 3/2016 |
| JP | 6059069 | 1/2017 |
| KR | 101664066 | 10/2016 |
| WO | 2020104798 | 5/2020 |
| WO | 2020184274 | 9/2020 |

* cited by examiner

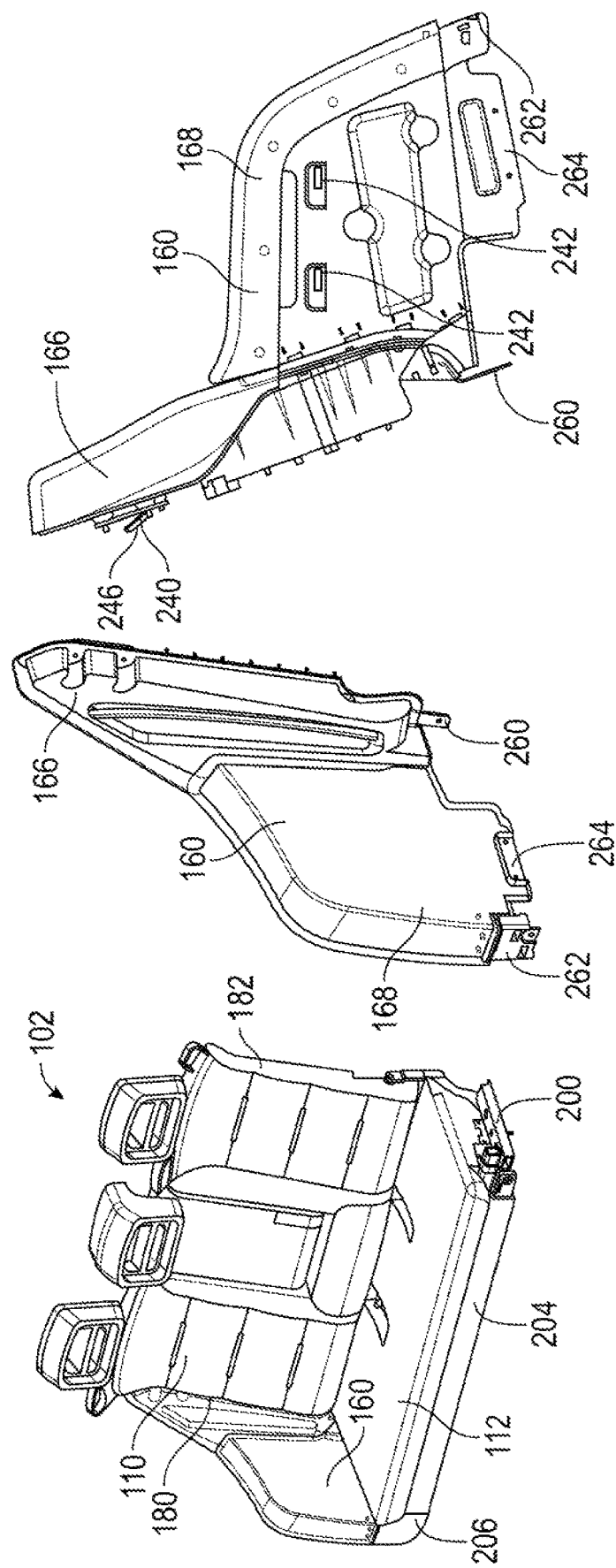

VEHICLE SEAT AND METHOD OF INSTALLATION

BACKGROUND

The present disclosure relates to a vehicle seat and a method of installing the vehicle seat. Currently, a vehicle seat is installed in a vehicle body by first mounting seat components (i.e., safety belt arrangements) to the vehicle body. With the components properly installed, trim garnishes are fitted to surrounding portions of the vehicle body. A seat back is then mounted to the vehicle body via a seat main frame, and a bolster and an armrest separate from the bolster are secured to the seat main frame. Finally, a seat base is mounted to the seat main frame via a seat base frame. However, this known installation method prevents the use of a single bolster and armrest component, thereby impacting the aesthetics of the installed vehicle seat.

BRIEF DESCRIPTION

According to one aspect, a vehicle assembly comprises a vehicle body including a side body component and a transverse body component, and a vehicle seat attached to the each of the side body component and the transverse body component of the vehicle body. The vehicle seat includes a seat main frame including a seat back attached to the seat main frame, a side member attached to the seat main frame, the side member defining an outboard bolster for the seat back and an armrest, and a seat base attached to the seat main frame. Each of the seat main frame, the side member and the seat base is a separate and distinct seat component of the vehicle seat. A first connection bracket is secured to the transverse body component adjacent an outboard side edge portion of the seat back, and the outboard bolster of the side member is connected to the first connection bracket. A second connection bracket is secured to the side body component and extended toward the seat main frame, and the armrest of the side member is connected to the second connection bracket.

According to another aspect, a vehicle assembly method comprises providing a vehicle body including a side body component and a transverse body component; providing a vehicle seat including a seat main frame including a seat back attached to the seat main frame, a side member defining an outboard bolster for the seat back and an armrest, and a seat base, wherein each of the seat main frame, the side member and the seat base is a separate and distinct seat component of the vehicle seat; attaching the seat main frame to the vehicle body; providing a first connection bracket on the transverse body component adjacent an outboard side edge portion of the seat back, and connecting the outboard bolster of the side member to the first connection bracket; and providing a second connection bracket on the side body component, and connecting the armrest of the side member to the second connection bracket.

According to another aspect, a vehicle assembly comprises a vehicle body including a side body component and a transverse body component, and a vehicle seat attached to the each of the side body component and the transverse body component of the vehicle body. The vehicle seat includes a seat main frame including a seat back attached to the seat main frame, a side member attached to the seat main frame, the side member defining an outboard bolster for the seat back and an armrest, and a seat base attached to the seat main frame. A first connection bracket is secured to the transverse body component adjacent an outboard side edge portion of the seat back, and the outboard bolster of the side member is connected to the first connection bracket. A second connection bracket is secured to the side body component and extended toward the seat main frame, and the armrest of the side member is connected to the second connection bracket. The connection of the outboard bolster of the side member to the first connection bracket defines a pivot location allowing rotation of the side member relative to the seat main frame for alignment of the armrest with the second connection bracket.

BRIEF DESCRIPTION OF THE DRAWINGS

FIG. 2 is a perspective view of the vehicle seat assembly with a right side member removed.

FIG. 3 is an inside perspective view of a left side member of the vehicle seat assembly.

FIG. 4 is an outside perspective view of the left side member.

FIGS. 7-14 depict an exemplary method for assembling a vehicle, wherein FIGS. 7 and 8 are respective front and side views of a left side portion of the vehicle seat assembly with the left side member removed and a vehicle body.

FIGS. 9 and 10 are respective front and side views of FIGS. 7 and 8 with the left side member being positioned for first attachment to the vehicle seat assembly.

FIGS. 11 and 12 are respective front and side views of FIGS. 9 and 10 with the left side member initially attachment to the vehicle seat assembly.

FIGS. 13 and 14 are respective front and side views of FIGS. 11 and 12 with the left side member attached to both the vehicle seat assembly and the vehicle body.

DETAILED DESCRIPTION

It should, of course, be understood that the description and drawings herein are merely illustrative and that various modifications and changes can be made in the structures disclosed without departing from the present disclosure. Spatially relative terms, such as "lower," "upper", "left", "right" and the like may be used to describe an element and/or feature's relationship to another element(s) and/or feature(s) as, for example, illustrated in the figures. Further, the term "substantially" is defined to be essentially conforming to the particular dimension, shape or other word that substantially modifies, such that the component need not be exact.

Figure 1:
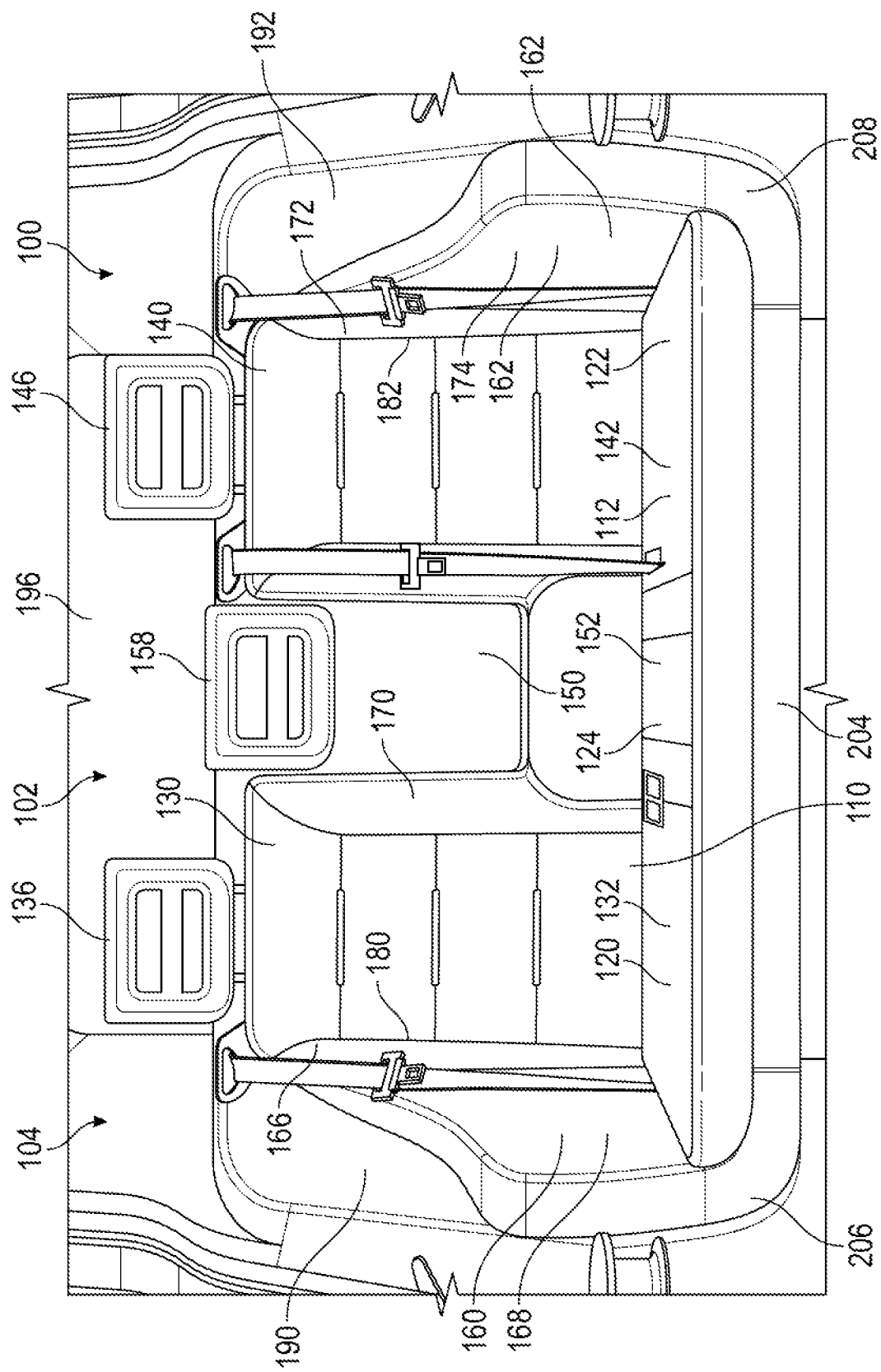
FIG. 1 is a perspective view of an exemplary vehicle seat assembly installed in a vehicle body according to the present disclosure.
Figure 5:
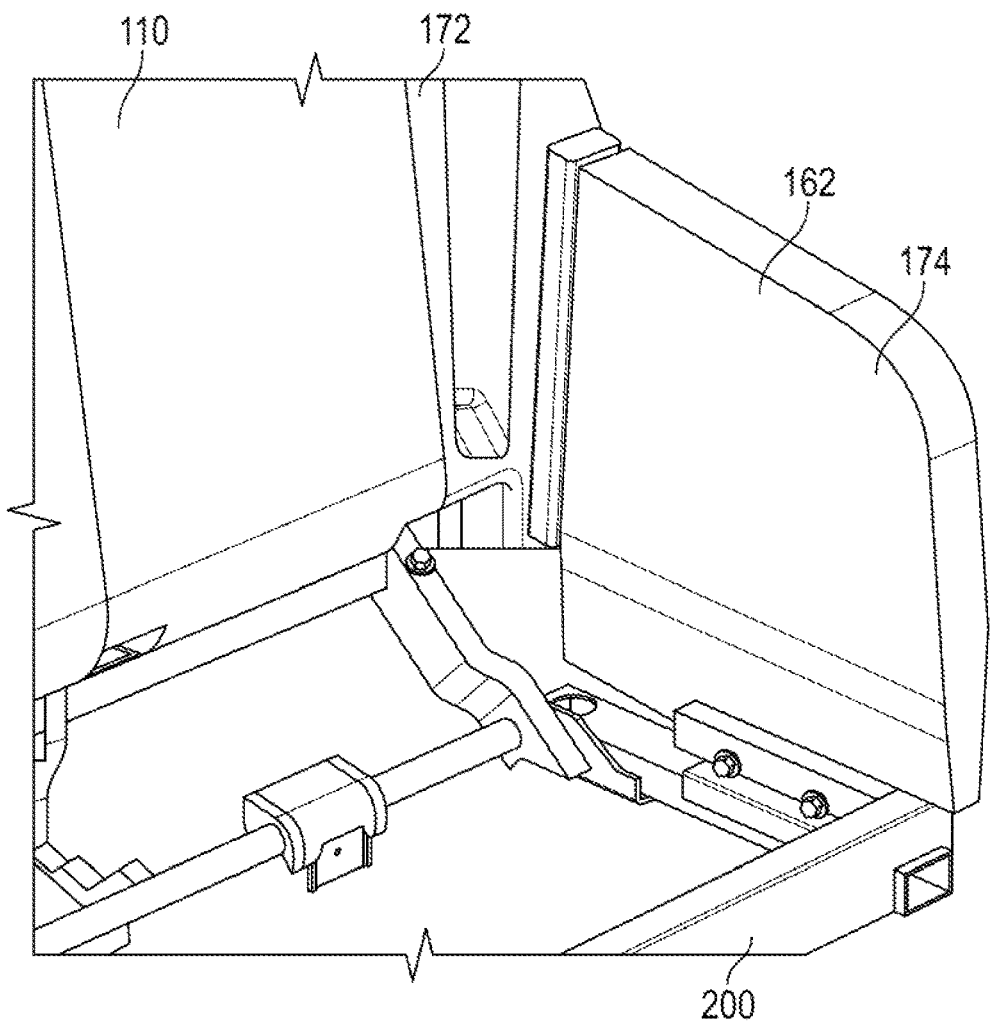
FIG. 5 is a partial perspective view showing attachment of the right side member to a seat main frame.
Figure 6:
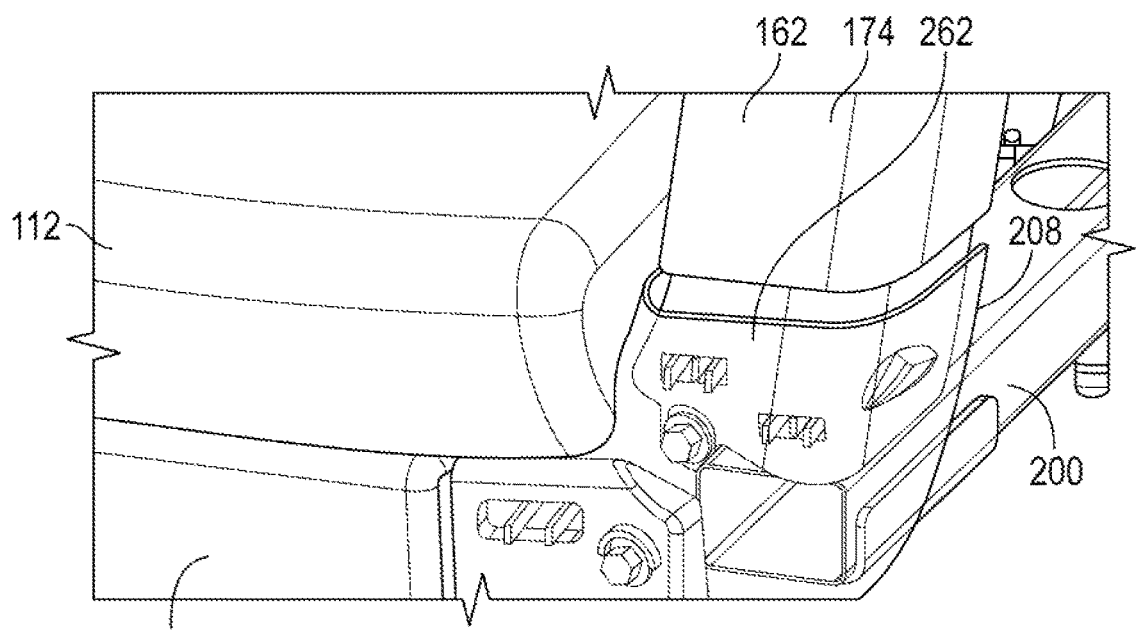
FIG. 6 is a detail perspective view of a right side portion of the vehicle seat assembly with a corner cover member shown in transparent to illustrate attachments of seat components of the vehicle seat assembly.

Referring now to the drawings, wherein like numerals refer to like parts throughout the several views, FIG. 1 illustrates a vehicle 100 comprising a vehicle seat 102 installed in a vehicle body 104 according to the present disclosure. The vehicle seat 102 comprises a seat back 110 and a seat base 112. The seat back 110 and the seat base 112 together define a first or left outboard seating section 120, a second or right outboard seating section 122 spaced from the first outboard seating section in a width direction of the vehicle seat, and optionally a center seating section 124 positioned between the first and second outboard seating sections 120, 122 in the width direction. The first outboard seating section 120 includes a first seat back 130 and a first seat base 132, and optionally a first headrest 136 connected to the first seat back. The second outboard seating section 122 includes a second seat back 140 and a second seat base 142, and optionally a second headrest 146 connected to the second seat back. The center seating section 124, if provided by the vehicle seat 102, includes a center seat back 150 and a center seat base 152, and optionally a center headrest 158 connected to the center seat back. It should be appreciated that the center seating section 124 serves as an auxiliary seat between the first and second outboard seating sections 120, 122, and therefore can be sized in the width direction smaller than first and second outboard seating sections 120, 122. Further, the vehicle seat 102 includes a first or left side member 160 associated with the first outboard seating section 120 and a second or right side member 162 associated with the second outboard seating section 122. The first side member 160 unitarily defines a first outboard bolster 166 for the first seat back 132 and a first armrest 168. The first outboard bolster 166 is shaped and sized to substantially correspond to a first inboard bolster 170 of the first seat back 132. The second side member 162 unitarily defines a second outboard bolster 172 for the second seat back 140 and a second armrest 174. The second outboard bolster 172 is shaped and sized to substantially correspond to a second inboard bolster 176 of the second seat back 142. To accommodate the first and second outboard bolsters 166, 172, the first and second seatbacks 130, 132 include respective first and second outboard recessed portions 180, 182. The first and second outboard bolsters 166, 172 of the respective first and second side member 160, 162 are positioned in and conform to the first and second outboard recessed portions 180, 182. Safety belt arrangements are provided for each of the seating sections.

In FIG. 1, the vehicle seat 102 is installed in the vehicle body 104. The vehicle body 102 is part of the vehicle 100, which in the present embodiment is an autonomously-driven vehicle configured such that each side of the vehicle body 104 can define a single door opening which is closed by a sliding door (not shown). It should be appreciated that the term "vehicle body" is used generically, and should be interpreted to include structural components of the vehicle 100, such as a body frame, a roof structure, a floor structure, a door(s), exterior panels, interior panels, and the like. The depicted vehicle body 104 includes left and right side panel members 190, 192, wherein the vehicle seat 102 is fitted between the left and right side panel members with the first or left side member 160 in abutment with the left side panel member 190, and with the second or right side member 162 in abutment with the right side panel member 192. A rear panel member 196 of the vehicle body spans rearward of the vehicle seat 102 in a front-rear direction of the vehicle seat.

With additional reference to FIGS. 2-6, the vehicle seat 102 further includes a seat main frame 200 to which the seat back 110 attached. Each of the first and second side members 160, 162, and the seat base 110 is attached to the seat main frame 200. Further, each of the seat main frame 200 including the seat back 110, the first side member 160, the second side member 162, and the seat base 112 is a separate and distinct seat component of the vehicle seat 102, which can be separately installed in the vehicle body 104. Each of the first and second side members 160, 162 is a unitary, one-piece seat component (i.e., the outboard bolster integral with the armrest). The vehicle seat 102 is further provided with a cushion cover member 204 positioned beneath the seat base 112 for covering the attachment of the seat base and the seat main frame 200. Each end portion of the cushion cover member 204 is attached to the seat main frame 200. Left and right corner cover members 206, 208 separate from the left and right side members 160, 162 and the seat base 112 are provided and adapted to cover the attachment of the respective left and right side members 160, 162 to the seat main frame 200 and cover the attachment of the cushion cover member 204 to the seat main frame.

In a front view of the vehicle seat 102 installed in the vehicle body 104, an outer surface of each of the armrest 168 of the left side member 160 and the left corner cover member 206 is shaped to mate with an inner surface of the left side panel member 190, and an outer surface of each of the armrest 174 of the right side member 162 and the right corner cover 208 member is shaped to mate with an inner surface of the right side panel member 192. Further, the armrest 168, 174 of each of the left and right side members 160, 162, the left and right corner cover members 206, 208 and the cushion cover member 204 are configured to together define a substantially continuous outer surface of the vehicle seat 102 that spans between the left and right side panel members 190, 192 of the vehicle body 104.

Figure 7:
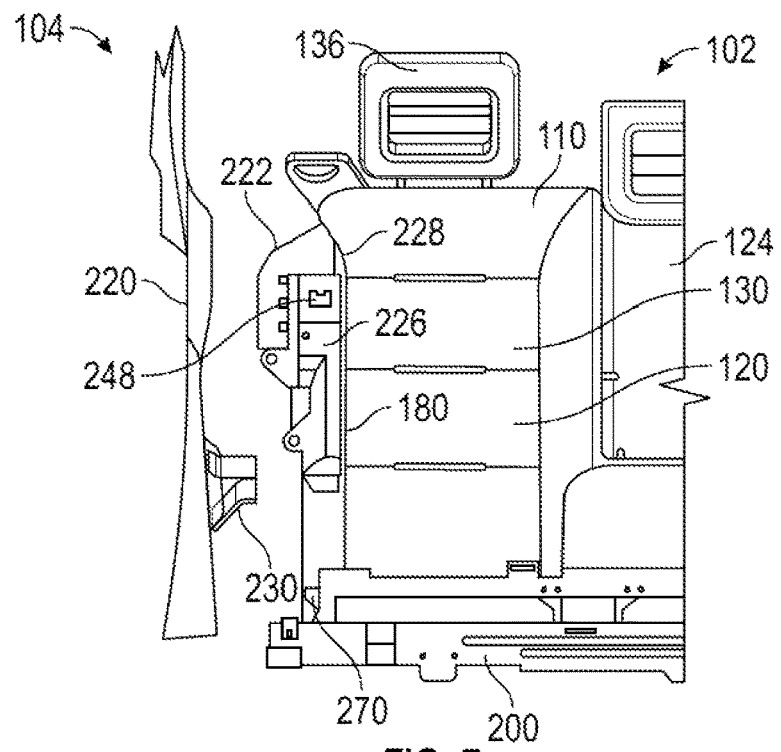
Figure 8:
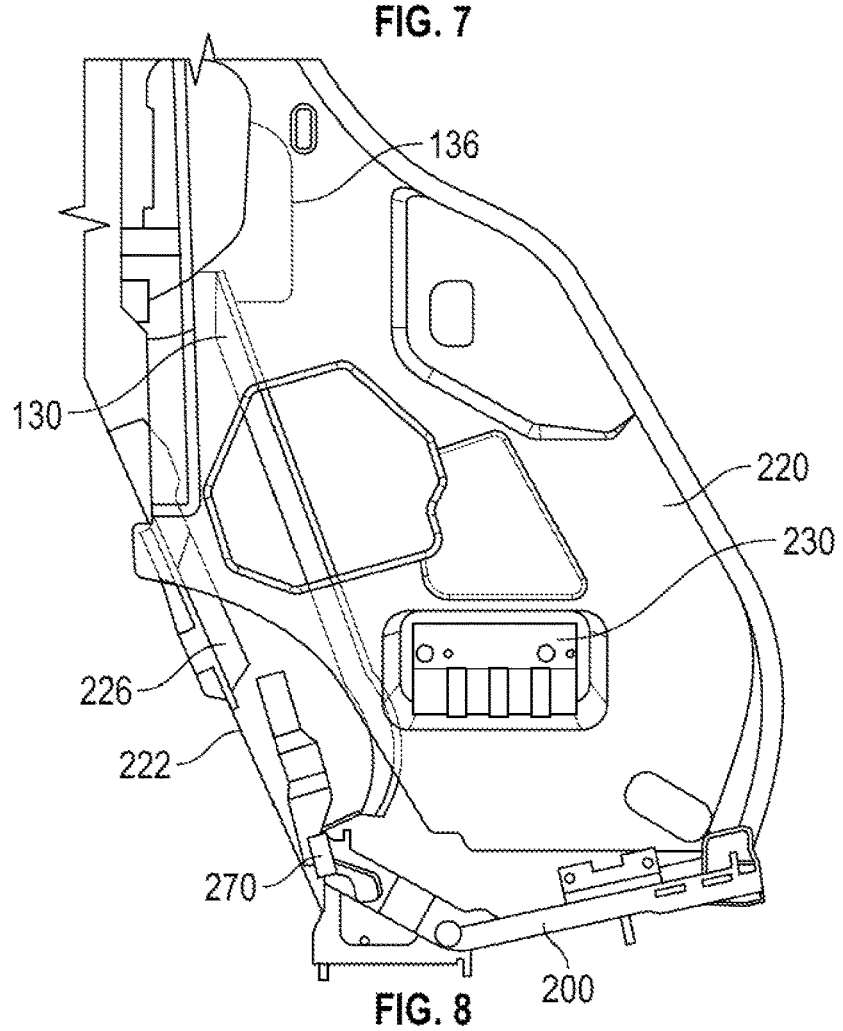

FIGS. 7 and 8 depict partial installation of the vehicle seat 102 in the vehicle body 104, where the seat main frame 200 with the seat back 110 connected thereto is first attached to the vehicle body. The vehicle body 104 including a side body component 220 to be covered by the left side panel member 190 and a transverse body component 222 to be covered by the rear panel member 196. The first seat back 130 of the first outboard seating section 120, which defines the first outboard recessed portion 180 for the first outboard bolster 166 of the first side member 160, is spaced in the width direction from the side body component 220. This spacing allows for the mounting of the separate first side member 160. According to the present disclosure, the vehicle seat 102 is attached to the each of the side body component 220 and the transverse body component 222 of the vehicle body 104. To this end, a first connection bracket 226 is secured to the transverse body component 22 adjacent an outboard side edge portion 228 of the seat back 110. A second connection bracket 230 is secured to the side body component 220 and extended toward the seat main frame 220. To be described with reference to FIGS. 9-14, the first side member 160 is adapted for connection to each of the first connection bracket 226 and the second connection bracket 230, more particularly, the first outboard bolster 166 of the first side member is connected to the first connection bracket 226, and the first armrest 168 of the first side member is connected to the second connection bracket 230.

Figure 9:
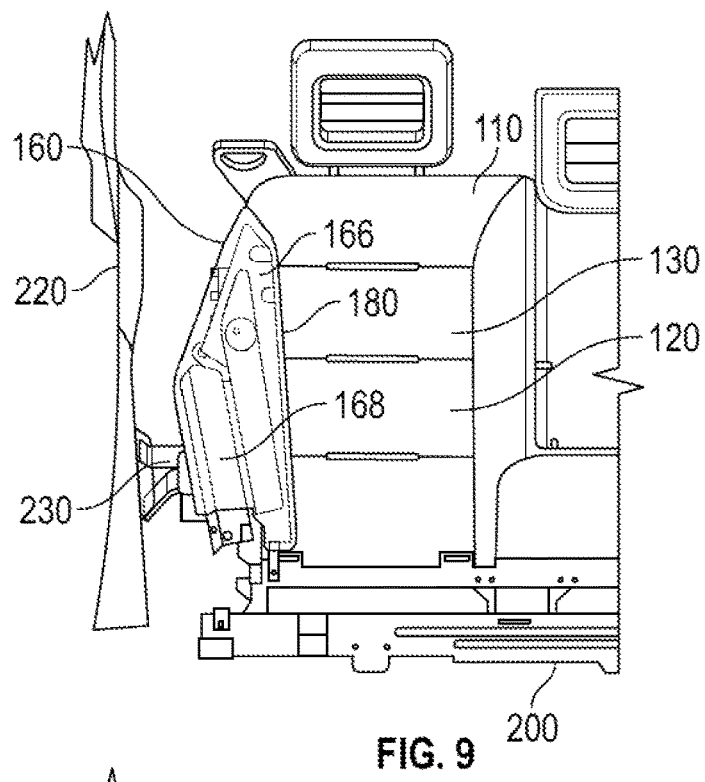
Figure 10:
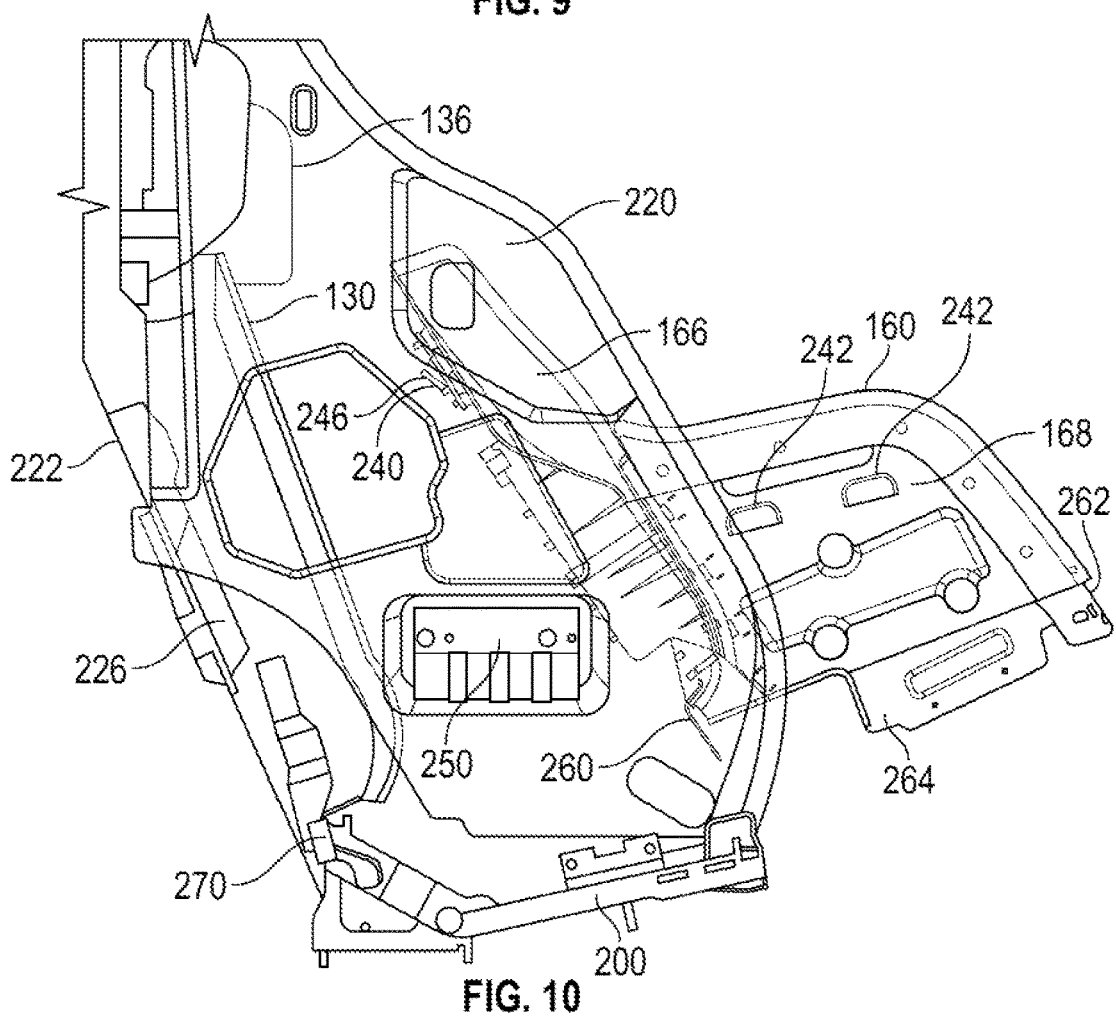

The first side member 160 includes a first attachment member 240 for attachment to the first connection bracket 226 and a second attachment member 242 for attachment to the second connection bracket 230. According to the present disclosure, the first attachment member 240 is provided on the first outboard bolster 166 and is adapted to secure the first side member 160 to the transverse body component 222 of the vehicle body 104. The first attachment member 240 is also adapted to allow for movement of the first side member 160 relative to the seat main frame 200 in assembly such that that the second attachment member 242, which is provided on the first armrest 168, is in alignment with the second connection bracket 230 to secure the first side member 160 to the side body component 220 of the vehicle body. In FIGS. 9 and 10, prior to connecting the first outboard bolster 166 of the first side member 160 to the first connection bracket 226, the first side member 160 is positioned angularly relative to the seat back 110 and the vehicle body 104 with the first outboard bolster 166 tilted downwardly between the seat back 110 and the side body component 220 to avoid interference with the second connection bracket 230 on the side body component. In the present aspect, the first attachment member 240 on the first outboard bolster of includes a hook member 246 that is extended upward in a height direction of the vehicle seat 102. The first connection bracket 226 includes an opening 248 for receiving the hook member (see FIG. 7).

Figure 11:
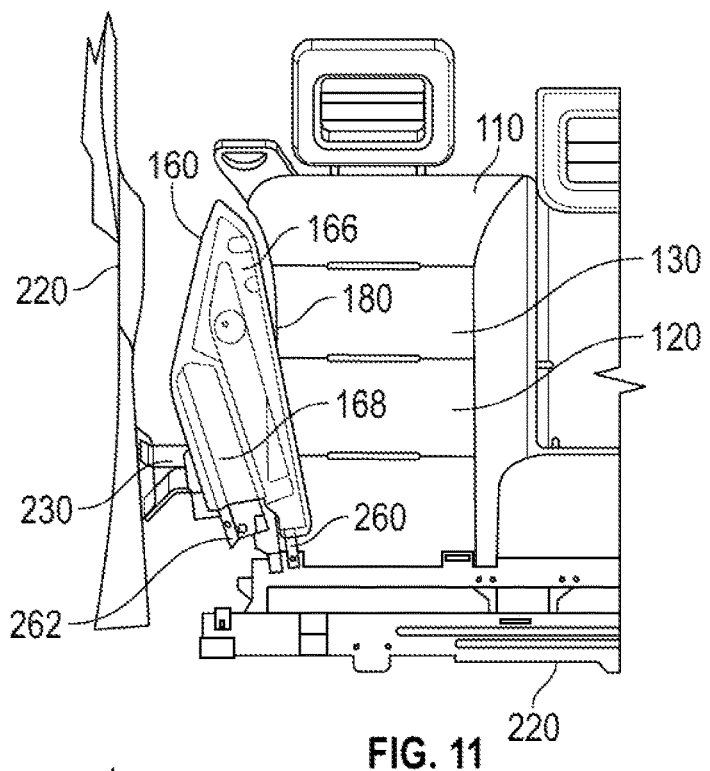
Figure 12:
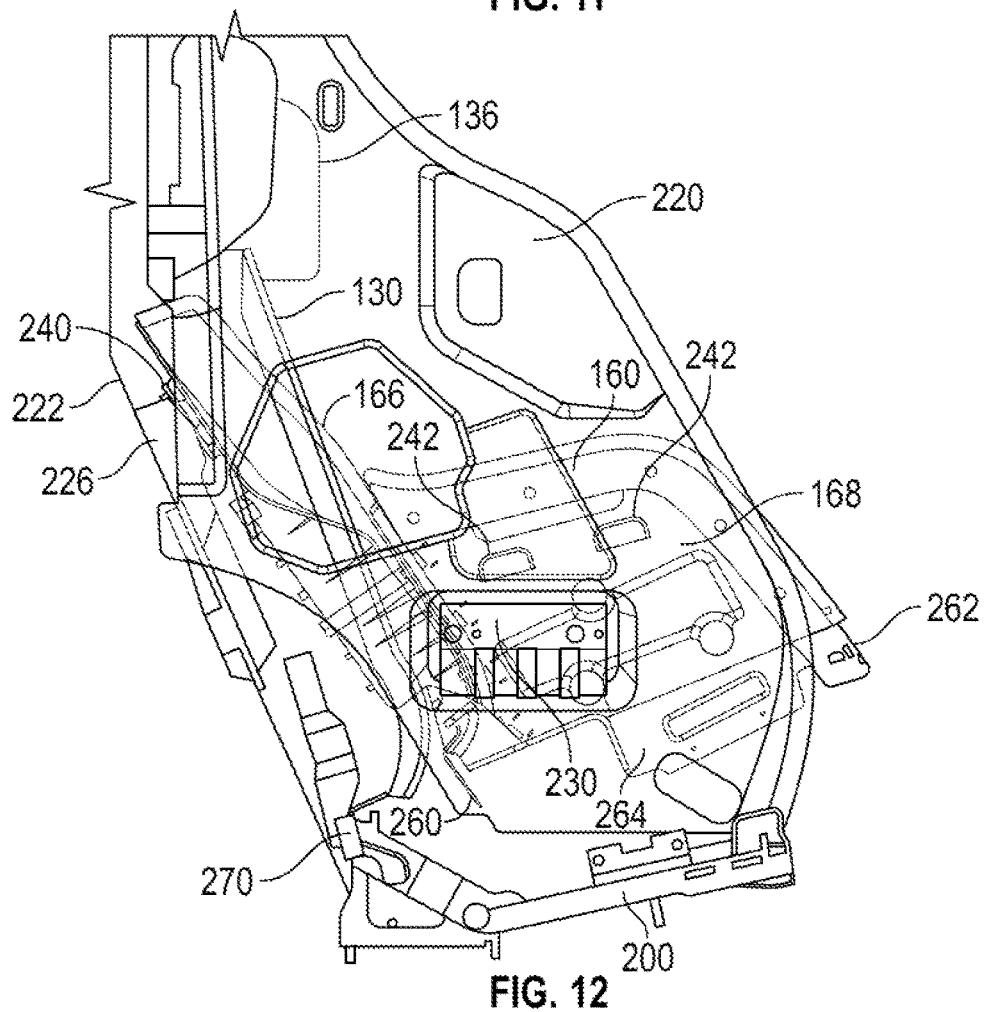
Figure 13:
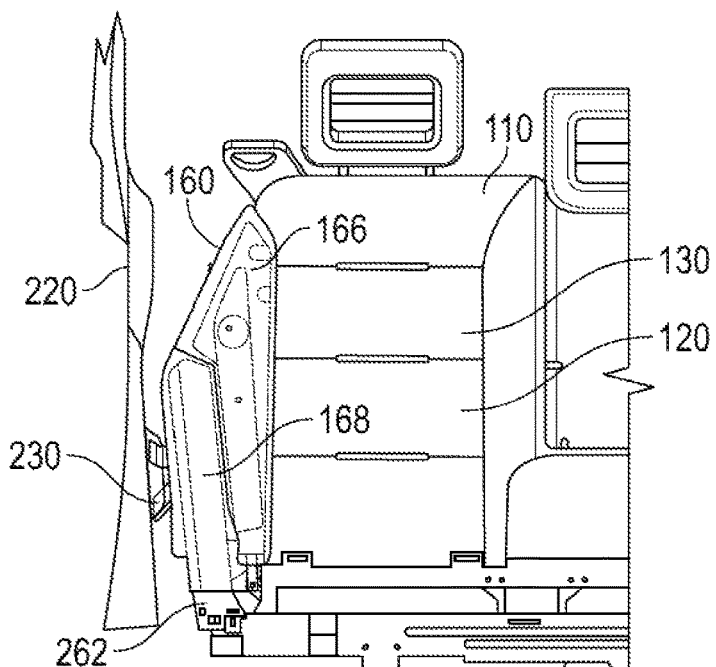
Figure 14:
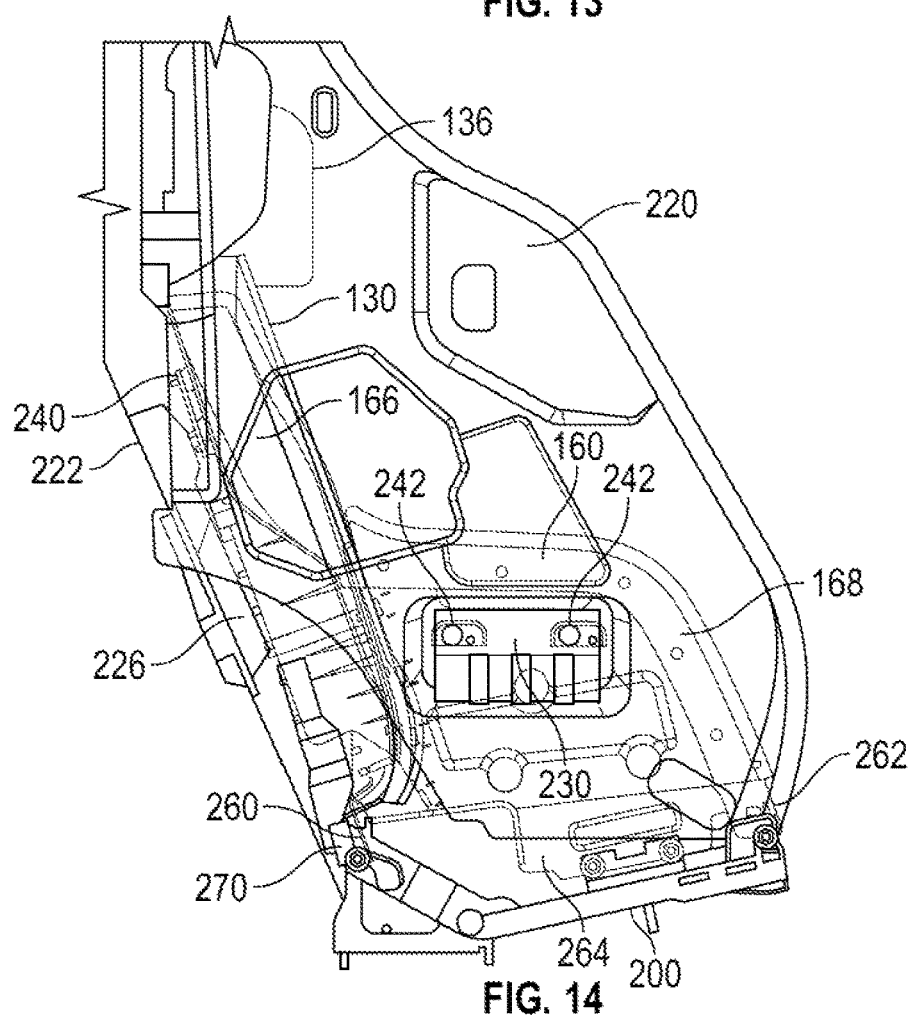

In FIGS. 11 and 12, the hook member 246 is received in the opening 248, thereby connecting the first outboard bolster 166 to the first connection bracket 226. The first side member 160 remains angularly oriented to avoid interference with the second connection bracket 230. The connection of the first outboard bolster 166 of the first side member to the first connection bracket 226 defines a pivot location allowing rotation of the first side member 160 relative to the seat main frame 200 and the side body component 220 for alignment of the first armrest 168 with the second connection bracket 230. In FIGS. 13 and 14, the second attachment member 242 is rotated into attachment to the second connection bracket 230. According to the present aspect, to allow for this connection, the second attachment member 242 includes a clip member that engages the second connection bracket 230 as the first side member 160 is rotated about the pivot connection; although, alternative fastening members are contemplated.

With reference back to FIGS. 2-6, each of the first and second side members 160, 162 includes a rear attachment bracket 260 extended downward from the respective first and second outboard bolsters 166, 172 for connection to one of the transverse body component 222 and the seat main frame 200. Each of the first and second side members 160, 162 includes a forward attachment bracket 262 extended downward from the respective first and second armrests 168, 174 for connection to the seat main frame 200. Further, each of the first and second side members 160, 162 includes a lower attachment bracket 264 extended downward from the respective first and second armrests 168, 174 between the rear and forward attachment brackets 260, 262 for attachment to the seat main frame 200. With reference again to FIGS. 13 and 14, with the first and second attachment members 240, 242 connected to the respective first and second connection brackets 226, 230, the rear attachment bracket 260 is attached (i.e., fastened) to a third connection bracket 270 provided on the transverse body component 222 of the vehicle body 104. Each of the forward attachment bracket 262 and the lower attachment bracket 264 is attached (i.e., fastened) to the seat main frame 200. Therefore, the additional attachment brackets 260, 262, 264 provided on the first side member 160 ensure proper securement of the first side member 160 to the seat main frame 200 and the vehicle body 104. It should be appreciated that because the second side member 162 is constituted similar to the first side member 160, the installation of the second side member 162 to the vehicle seat 102 and the vehicle body 104 is similar to the above described installation of the first side member 160.

A vehicle assembly method is further provided by the present disclosure. The exemplary method comprises providing the vehicle body 104 including the side body component 220 and the transverse body component 222; providing the vehicle seat 102 including the seat main frame 200 including the seat back 110 attached to the seat main frame, the side member 160, 162 defining the outboard bolster 166, 172 for the seat back and the armrest 168, 174, and the seat base 112, wherein each of the seat main frame, the side member and the seat base is a separate and distinct seat component of the vehicle seat; attaching the seat main frame 200 to the vehicle body 104; providing the first connection bracket 226 on the transverse body component 222 adjacent the outboard side edge portion of the seat back 110, and connecting the outboard bolster 166, 172 of the side member 160, 162 to the first connection bracket 226; and providing the second connection bracket 230 on the side body component 220, and connecting the armrest 168, 174 of the side member 160, 162 to the second connection bracket 230.

The connection of the outboard bolster 166, 172 of the side member 160, 162 to the first connection bracket 226 defines a pivot location, and the exemplary method includes rotating the side member 160, 162 relative to the seat main frame 200 for alignment of the armrest 168, 174 with the second connection bracket 230. Prior to connecting the outboard bolster 166, 172 of the side member to the first connection bracket 226, the exemplary method includes angularly positioning the side member 160, 162 with the outboard bolster 166, 172 tilted downwardly between the seat back 110 and the side body component 220 to avoid interference with the second connection bracket 230 on the side body component. The exemplary method includes connecting the rear attachment bracket 260 extended downward from the outboard bolster 166, 172 to one of the transverse body component 222 and the seat main frame 200, and connecting the forward attachment bracket 262 and the lower attachment bracket 264 each extended downward from the armrest 168, 174 to the seat main frame 200. The exemplary method further includes attaching the seat base 112 to the seat main frame 200, attaching the separate cushion cover member 204 to the seat main frame 200 beneath the seat base 112 for covering the attachment of the seat base and the seat main frame, and attaching a separate corner cover member 206, 208 to the side member 160, 162 and the cushion cover member 204 to cover the attachment of the forward attachment bracket 262 to the seat main frame 200 and to cover the attachment of cushion cover member 204 to the seat main frame 200.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle assembly comprising:
   a vehicle body including a side body component and a transverse body component; and
   a vehicle seat attached to the each of the side body component and the transverse body component of the vehicle body, the vehicle seat including:
   a seat main frame including a seat back attached to the seat main frame,
   a side member attached to the seat main frame, the side member defining an outboard bolster for the seat back and an armrest, and
   a seat base attached to the seat main frame, wherein each of the seat main frame, the side member and the seat base is a separate and distinct seat component of the vehicle seat;
   wherein a first connection bracket is secured to the transverse body component adjacent an outboard side edge portion of the seat back, and the outboard bolster of the side member includes a first attachment member that is connected to the first connection bracket,
wherein a second connection bracket is secured to the side body component and extended toward the seat main frame, and the armrest of the side member includes a second attachment member that is connected to the second connection bracket,
wherein the connection of the outboard bolster of the side member to the first connection bracket defines a pivot location allowing rotation of the side member relative to the seat main frame for alignment of the armrest with the second connection bracket.

2. The vehicle assembly of claim 1, wherein the outboard bolster of the side member includes a hook member as the first attachment member and the first connection bracket includes an opening for receiving the hook member.

3. The vehicle assembly of claim 1, wherein the armrest includes a clip member as the second attachment member for connection with the second connection bracket.

4. The vehicle assembly of claim 1, wherein the side member includes a rear attachment bracket extended downward from the outboard bolster for connection to one of the transverse body component and the seat main frame.

5. The vehicle assembly of claim 4, wherein the side member includes a forward attachment bracket extended downward from the armrest for connection to the seat main frame.

6. The vehicle assembly of claim 5, wherein the side member includes a lower attachment bracket extended downward from the armrest between the rear and forward attachment brackets for attachment to the seat main frame.

7. The vehicle assembly of claim 5, including a cushion cover member positioned beneath the seat base for covering the attachment of the seat base and the seat main frame, an end portion of the cushion cover member is attached to the seat main frame.

8. The vehicle assembly of claim 7, including a corner cover member separate from the side member and the seat base, the corner cover member is adapted to cover the attachment of the forward attachment bracket to the seat main frame and cover the attachment of the cushion cover member to the seat main frame.

9. The vehicle assembly of claim 1, wherein the side member is a unitary, one-piece seat component, the bolster integral with the armrest.

10. The vehicle assembly of claim 9, wherein seat back includes an outboard recessed portion, and the outboard bolster of the side member is positioned in the recessed portion.

11. A vehicle assembly method comprising:
providing a vehicle body including a side body component and a transverse body component;
providing a vehicle seat including:
a seat main frame including a seat back attached to the seat main frame,
a side member defining an outboard bolster for the seat back and an armrest, and
a seat base, wherein each of the seat main frame, the side member and the seat base is a separate and distinct seat component of the vehicle seat;
attaching the seat main frame to the vehicle body;
providing a first connection bracket on the transverse body component adjacent an outboard side edge portion of the seat back, providing a first attachment member on the outboard bolster, and connecting the first attachment member on the outboard bolster of the side member to the first connection bracket; and
providing a second connection bracket on the side body component, providing a second attachment member on the armrest, and connecting the second attachment member on the armrest of the side member to the second connection bracket,
wherein the connection of the outboard bolster of the side member to the first connection bracket defines a pivot location, and rotating the side member relative to the seat main frame for alignment of the armrest with the second connection bracket.

12. The method of claim 11, wherein prior to connecting the outboard bolster of the side member to the first connection bracket, angularly positioning the side member with the outboard bolster tilted downwardly between the seat back and the side body component to avoid interference with the second connection bracket on the side body component.

13. The method of claim 11, including connecting a rear attachment bracket extended downward from the outboard bolster to one of the transverse body component and the seat main frame.

14. The method of claim 13, including connecting a forward attachment bracket and a lower attachment bracket each extended downward from the armrest to the seat main frame.

15. The method of claim 11, including:
attaching the seat base to the seat main frame,
attaching a separate cushion cover member to the seat main frame beneath the seat base for covering the attachment of the seat base and the seat main frame,
attaching a separate corner cover member to the side member and the cushion cover member to cover the attachment of the forward attachment bracket to the seat main frame and to cover the attachment of cushion cover member to the seat main frame.

16. A vehicle assembly comprising:
a vehicle body including a side body component and a transverse body component; and
a vehicle seat attached to the each of the side body component and the transverse body component of the vehicle body, the vehicle seat including:
a seat main frame including a seat back attached to the seat main frame,
a side member attached to the seat main frame, the side member defining an outboard bolster for the seat back and an armrest, and
a seat base attached to the seat main frame;
wherein a first connection bracket is secured to the transverse body component adjacent an outboard side edge portion of the seat back, and the outboard bolster of the side member is connected to the first connection bracket,
wherein a second connection bracket is secured to the side body component and extended toward the seat main frame, and the armrest of the side member is connected to the second connection bracket,
wherein the connection of the outboard bolster of the side member to the first connection bracket defines a pivot location allowing rotation of the side member relative to the seat main frame for alignment of the armrest with the second connection bracket,
wherein the side member includes a rear attachment bracket extended downward from the outboard bolster for connection to one of the transverse body component and the seat main frame, and a forward attachment bracket extended downward from the armrest for connection to the seat main frame.

17. The vehicle assembly of claim 16, wherein the outboard bolster of the side member includes a hook member and the first connection bracket includes an opening for receiving the hook member, and the armrest includes a clip member for connection with the second connection bracket.

18. The vehicle assembly of claim 16, wherein the side member includes:
 a lower attachment bracket extended downward from the armrest between the rear and forward attachment brackets for attachment to the seat main frame.

\* \* \* \* \*